(12) United States Patent
Yamamoto et al.

(10) Patent No.: US 7,877,122 B2
(45) Date of Patent: Jan. 25, 2011

(54) FOLDING PORTABLE ELECTRONIC DEVICE

(75) Inventors: Takeshi Yamamoto, Hiroshima (JP); Yoshihiko Handa, Hiroshima (JP); Shinichi Koarata, Kanagawa (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 500 days.

(21) Appl. No.: 12/039,318

(22) Filed: Feb. 28, 2008

(65) Prior Publication Data

US 2008/0232048 A1    Sep. 25, 2008

(30) Foreign Application Priority Data

Mar. 22, 2007  (JP)  ............................. 2007-074495

(51) Int. Cl.
*H04M 1/00* (2006.01)
*H04B 1/38* (2006.01)

(52) U.S. Cl. ................. 455/575.3; 455/575.1; 455/90.3

(58) Field of Classification Search .............. 455/575.3, 455/575.1, 550.1, 90.3, 566; 379/440, 446
See application file for complete search history.

(56) References Cited

U.S. PATENT DOCUMENTS

| | | | | |
|---|---|---|---|---|
| 7,174,195 B2 * | 2/2007 | Nagamine | ................ | 455/575.1 |
| 7,440,782 B2 * | 10/2008 | Cha | ........................ | 455/575.3 |
| 7,538,820 B2 * | 5/2009 | Tomoeda et al. | ............ | 348/552 |
| 7,546,150 B2 * | 6/2009 | Makino | .................... | 455/575.1 |
| 7,580,736 B2 * | 8/2009 | Ronkko et al. | ........... | 455/575.3 |
| 7,671,841 B2 * | 3/2010 | Lee et al. | .................... | 345/158 |
| 7,711,398 B2 * | 5/2010 | Kim | ........................ | 455/575.3 |
| 2003/0013417 A1 | 1/2003 | Bum | | |
| 2003/0203747 A1 | 10/2003 | Nagamine | | |
| 2006/0172764 A1 | 8/2006 | Makino | | |

FOREIGN PATENT DOCUMENTS

| | | |
|---|---|---|
| JP | 2001-156893 A | 6/2001 |
| JP | 2003-114670 A | 4/2003 |
| JP | 2003-319043 A | 11/2003 |
| JP | 2006-211576 A | 8/2006 |

* cited by examiner

*Primary Examiner*—Sonny Trinh
(74) *Attorney, Agent, or Firm*—Birch, Stewart, Kolasch & Birch, LLP

(57) ABSTRACT

In a folding mobile phone (folding portable electronic device), a cam mechanism (support mechanism) includes a first guide groove, a second guide groove, a first guide pin engaged into the first guide groove, a second guide pin engaged into the second guide groove, and a link member connecting the first and second guide pins. The cam mechanism supports a liquid crystal display part to allow the liquid crystal display part to turn clockwise and counterclockwise as viewed from the front, thereby allowing the liquid crystal display part to be changed between a vertical position and a horizontal position. Furthermore, the cam mechanism includes an urging mechanism urging the second guide pin to allow the liquid crystal display part to reach the vertical or horizontal position in either turning direction.

10 Claims, 12 Drawing Sheets

FOLDING PORTABLE ELECTRONIC DEVICE

CROSS-REFERENCE TO RELATED APPLICATION

This application claims priority under 35 USC 119 to Japanese Patent Application No. 2007-74495 filed on Mar. 22, 2007, the entire contents of which are incorporated herein by reference.

BACKGROUND OF THE INVENTION (a) Field of the Invention

This invention relates to folding portable electronic devices and particularly relates to those in which a display part is supported changeably between a vertical position and a horizontal position.

(b) Description of Related Art

A recent trend has been to watch TV away from home using a folding mobile phone. Folding mobile phones generally have a display part longitudinally extending when the user holds it in his or her hand. Therefore, when the user watches TV on the longitudinally-extending display part, the size of the TV screen is very small with respect to the total display size. There have been conventional conflicting needs, i.e., a portability need to make the folding mobile phone size as small as possible and a visuality need to watch TV on a large screen.

If the mobile phone itself is horizontally oriented and the screen is changed to a landscape mode, TV screen images can be displayed on the full display. To keep the display part of the mobile phone horizontally oriented, it is necessary to keep on holding the mobile phone, as turned 90 degrees into a horizontal position, with one hand or both hands or to stably keep the horizontally oriented folding mobile phone with a special holder. However, it is difficult to continue to watch TV while holding the mobile phone with one hand or both hands and to find an appropriate holder away from home.

To cope with this, some techniques have been proposed in which the display part, which is provided on an upper housing of the folding mobile phone, is turned 90 degrees with respect to a lower housing thereof and the back face of the lower housing is left to rest on a place where the mobile phone is, thereby relatively stably putting the mobile phone on the place while allowing TV watching.

For example, Published Japanese Patent Application No. 2001-156893 discloses a folding portable electronic device in which the display part is supported to a first housing changeably from the vertical to horizontal position with the portable electronic device itself held in the vertical position in hand. Specifically, the folding portable electronic device has a pivot pin provided at the center of the display part and extending orthogonally to the display part, whereby the display part can be turned 90 degrees about the pivot pin.

Published Japanese Patent Application No. 2003-114670 discloses a portable electronic device including: a first casing having a large number of input keys; a second casing having a display part capable of displaying letters and images; a link member hinge-jointed at one end to the first casing foldably together and connected at the other end in contacting relation to one region of the second casing; a pivotally actuating means, disposed between the one region of the second casing and the other end of the link member, for pivotally moving the second casing along the contact surface with the link member within a predetermined range of angles; and a signal processor for converting an image displayed on the display part when the second casing is pivotally moved by the pivotally actuating means. According to the portable electronic device, the display part can change its position from vertical to horizontal or vice versa and can also change its screen size.

Alternatively, a known folding portable electronic device disclosed in Published Japanese Patent Application No. 2003-319043 has a support mechanism that supports a display part slidably and pivotably on a first housing. According to the folding portable electronic device, the display part is first vertically slid and then moved pivotally about a pivot pin provided at the center of the display part. Therefore, the display part can accordingly avoid its contact with the hinge and a swelled part provided at the lower end of the first housing and thereby increase the display size.

Furthermore, another known folding portable electronic device as disclosed in Published Japanese Patent Application No. 2006-211576 includes a first housing including a display part provided at a surface thereof, a second housing including an operating part provided at a surface thereof and a hinge connecting the first and second housings to allow the first and second housings to be freely opened and closed in their folded form, wherein the display part is supported to the first housing through a support mechanism changeably between a vertical position and a horizontal position and the support mechanism is configured to guide and support the display part to allow the display part to change between the vertical and horizontal positions so that a lower corner of the display part moves along the hinge when the display part is changed in position.

In all of the above known techniques, a mechanism for turning the display part is provided on the back face so that the display part can be turned from the vertical to horizontal position in a single direction. Thus, the display part can be oriented vertically and horizontally and the image size to be displayed thereon can be changed.

However, as can be expected, whether the direction to provide ease of turning operation of the display part is clockwise or counterclockwise as viewed from the front depends upon whether the user is right-handed or left-handed. Furthermore, it can be expected that which direction provides ease of turning operation of the display part depends also upon whether the user holds the portable electronic device in the right hand or the left hand.

With the configurations as disclosed in Published Japanese Patent Applications Nos. 2001-156893 and 2003-114670, since the display part is supported to the first housing by a single pivot pin, it is not difficult to allow the display part to change between the vertical and horizontal positions in either turning direction, i.e., both clockwise and counterclockwise. However, in order to prevent the display part from coming into contact with the hinge, it is necessary to largely round the corners of the display part. This invites a problem of reduction of the screen size.

In the technique disclosed in Published Japanese Patent Application No. 2003-319043, since the display part is also supported to the first housing by a single pivot pin, it is not difficult to allow the display part to change between the vertical and horizontal positions both clockwise and counterclockwise. Furthermore, since the display part is once slid upward in changing between the vertical and horizontal positions, it is not necessary to largely round the corners of the display part in order to avoid contact with the hinge. However, this technique involves, after the turning of the display part, an additional step of sliding the display part again to return it to the original level, resulting in a complicated user's operation.

Since the folding portable electronic device disclosed in Published Japanese Patent Application No. 2006-211576 uses the cam mechanism, the display part does not come into contact with the hinge even when it is increased in size. However, in order to allow the display part to turn both clockwise and counterclockwise, the guide groove for guiding the position change of the display part must be increased in size. This also increases the size of the entire folding portable electronic device, thereby deteriorating the portability.

SUMMARY OF THE INVENTION

The present invention has been made in view of the foregoing points and, therefore, an object of the present invention is to restrain the size of the entire folding portable electronic device from increasing while maintaining the display screen in a large size, allow the display part to turn from the vertical to horizontal position both clockwise and counterclockwise as viewed from the front and allow the display part to be easily changed between the vertical and horizontal positions.

To attain the above object, the folding portable electronic device according to the present invention employs a cam mechanism to restrain the total size from increasing while maintaining the display screen in a large size and allow the display part to turn from the vertical to horizontal position in either turning direction, i.e., both clockwise and counterclockwise as viewed from the front, and employs an urging mechanism to urge the second guide pin to allow the display part to reach the vertical or horizontal position in either turning direction.

Specifically, a first aspect of the present invention is directed to a folding portable electronic device including: a first housing including a display part provided at a surface thereof; a second housing including an operating part provided at a surface thereof; and a hinge connecting the first and second housings to allow the first and second housings to be freely opened and closed in their folded form, the display part being supported to the first housing through a support mechanism changeably between a vertical position and a horizontal position.

Furthermore, the support mechanism comprises a cam mechanism including: a first guide groove formed in the first housing and composed of an upcurved left section and an upcurved right section continued to the left section; a second guide groove formed in the first housing away from the first guide groove; a first guide pin slidably engaged into the first guide groove; a second guide pin slidably engaged into the second guide groove; and a link member provided to the back face of the display part and connecting the first and second guide pins to each other, the cam mechanism supports the display part to allow the display part to turn clockwise and counterclockwise as viewed from the front, and the cam mechanism includes an urging mechanism urging the second guide pin to allow the display part to reach the vertical or horizontal position both clockwise and counterclockwise.

According to the above configuration, the first guide groove has a general shape like a sea gull with its wings extended as viewed from the front. When the display part is in the vertical position, the first guide pin is located at the lateral midpoint of the first guide groove and the second guide pin is located at the midpoint of the second guide groove. In changing the display part from the vertical to horizontal position by turning it clockwise as viewed from the front, by the action of the cam mechanism, the first guide pin slides to the left in the left section of the first guide groove towards the curve peak thereof in engaged relation with the first guide groove and concurrently the second guide pin slides upward in engaged relation with the second guide groove. When the first guide pin then passes the curve peak, it slides to the left in the left section of the first guide groove while moving down and concurrently the second guide pin is urged, in engaged relation with the second guide groove, by the urging mechanism to slide down in the second guide groove. Thus, the position change of the display part is assisted.

On the other hand, in changing the display part from the vertical to horizontal position by turning it counterclockwise as viewed from the front, by the action of the cam mechanism, the first guide pin slides to the right in the right section of the first guide groove towards the curve peak thereof in engaged relation with the first guide groove and concurrently the second guide pin slides upward in engaged relation with the second guide groove. When the first guide pin then passes the curve peak, it slides to the right in the right section of the first guide groove while moving down and concurrently the second guide pin is urged, in engaged relation with the second guide groove, by the urging mechanism to slide down in the second guide groove. Thus, the position change of the display part is assisted.

Since in this manner the cam mechanism supports the display part to the first housing to allow the display part to turn both clockwise and counterclockwise as viewed from the front, the display part of the folding portable electronic device can be turned in a user's desired direction and changed to its vertical or horizontal position. Furthermore, the display part is turned with up and down movement by the cam mechanism. Therefore, even when the display screen is maintained in a large size, the display part can be prevented from being in contact with the hinge and the swelled part at the lower end of the first housing. Furthermore, the size of the entire folding portable electronic device can be restrained by appropriately arranging the first and second guide grooves. Furthermore, since the turning of the display part is assisted by the urging mechanism, the user can turn the display part to the vertical or horizontal position in either turning direction with one hand.

A second aspect of the invention is the folding portable electronic device according to the first aspect of the invention, wherein the urging mechanism includes: a telescopic shaft pivotally supported at one end to the first housing above the second guide groove and pivotally connected at the other end to the second guide pin; and a compression spring carried about the telescopic shaft.

With the above configuration, when the second guide pin slides upward in engaged relation with the second guide groove, the telescopic shaft is contracted to compress the compression spring, whereby resilient energy is accumulated in the urging mechanism. Specifically, in changing the display part from the vertical to horizontal position by turning it clockwise as viewed from the front, by the action of the cam mechanism, the first guide pin slides to the left in the left section of the first guide groove towards the curve peak thereof in engaged relation with the first guide groove and concurrently the second guide pin slides upward in engaged relation with the second guide groove. Therefore, resilient energy is accumulated in the compression spring. When the first guide pin then passes the curve peak, the second guide pin slides down in engaged relation with the second guide groove while being urged by the compression spring and concurrently the first guide pin slides to the left in the left section of the first guide groove while moving down. When the second guide pin is thus urged by the urging mechanism, the display part turns while being assisted in changing its position by the urging mechanism and then reaches the horizontal position.

Contrariwise, in changing the display part from the horizontal to vertical position by clockwise turning, the first guide pin slides to the right from the left end of the first guide groove towards the curve peak of the left section and concurrently the second guide pin slides upward in engaged relation with the second guide groove. Therefore, resilient energy is accumulated in the compression spring. When the first guide pin passes the curve peak, the second guide pin is pushed down by the urging force of the compressed compression spring. Therefore, the display part turns while being assisted by the compression spring and then reaches the vertical position.

Similarly, also in changing the display part from the vertical to horizontal position by turning it counterclockwise as viewed from the front, the display part is turned while the compression spring is compressed until the first guide pin passes the curve peak. Then, when the first guide pin passes the curve peak, the display part is changed to the horizontal position while being assisted by the compression spring. Furthermore, also in changing the display part from the horizontal to vertical position by counterclockwise turning, the display part is turned while the compression spring is compressed until the first guide pin passes the curve peak. Then, when the first guide pin passes the curve peak, the display part is changed to the vertical position while being assisted by the compression spring. In this manner, the operation of position change of the display part can be assisted with an extremely simple structure.

A third aspect of the invention is the folding portable electronic device according to the second aspect of the invention, wherein the urging mechanism comprises a pair of right and left urging mechanisms.

Since the urging mechanism comprises a pair of right and left urging mechanisms, an urging force can be applied to the second guide pin from the right and left, which stabilizes the turning of the display part.

A fourth aspect of the invention is the folding portable electronic device according to any one of the first to third aspects of the invention, wherein the first guide groove is formed bilaterally symmetrically, and the second guide groove extends substantially vertically from above a midpoint of the first guide groove at which the left and right sections are joined.

With the above configuration, since the first guide groove is formed bilaterally symmetrically, the display part exhibits similar behaviors during clockwise turning and counterclockwise turning as viewed from the front. Furthermore, since the first and second guide grooves are both bilaterally symmetric, the grooves can be easily arranged.

A fifth aspect of the invention is the folding portable electronic device according to the fourth aspect of the invention, wherein in each of the left and right sections of the first guide groove, the length from the midpoint to an intermediate curve peak is longer than the length from the intermediate curve peak to the outside end.

With the above configuration, the lateral dimension of the first guide groove can be shortened, which prevents the size of the entire folding portable electronic device from increasing. In addition, it can be easily prevented that the first guide groove is exposed to view during the turning of the display part.

A sixth aspect of the invention is the folding portable electronic device according to any one of the first to fifth aspects of the invention, wherein the cam mechanism is configured to guide and support the display part to allow the display part to be changed between the vertical position and the horizontal position so that a lower right corner of the display part moves along the hinge when the display part is changed in position while turning clockwise as viewed from the front and that a lower left corner of the display part moves along the hinge when the display part is changed in position while turning counterclockwise as viewed from the front.

With the above configuration, during both clockwise turning and counterclockwise turning, the display part is changed in position while being guided and supported by the cam mechanism so that the lower right or left corner moves along the hinge. Thus, the display part moves while keeping a distance from the hinge. Therefore, even if the lower end of the display part is not rounded along a semicircle having the radius around the pivot pin for the display part as would otherwise conventionally be done, the display part does not come into contact with the hinge and the swelled part at the lower end of the first housing.

A seventh aspect of the invention is the folding portable electronic device according to any one of the first to sixth aspects of the invention, wherein the lateral middles of the display part in the vertical and horizontal positions are each located substantially in the lateral middle of the first housing.

Suppose that, like the known technique, the display part is provided at the center with a pivot pin supporting the display part to the first housing. In such a case, in order that the lateral middle of the display part in the horizontal position is located substantially in the lateral middle of the first housing, the upper side of the display part in the vertical position needs to be reduced in height according to the lower side thereof reduced in height, which reduces the size of the entire display part. According to the present invention, however, in changing the display part to the vertical or horizontal position, the display part can be guided by the cam mechanism to avoid contact with the hinge and the swelled part at the lower end of the first housing and the cam mechanism eliminates the need to provide the pivot pin at the vertical midpoint of the display part unlike the known technique. Therefore, without the need to reduce the height of the upper side of the display part in the vertical position, the display part is located in the lateral middle of the first housing not only in the vertical position but also in the horizontal position. As a result, the display part is located in the lateral middle with respect to the operating part.

An eight aspect of the invention is the folding portable electronic device according to the seventh aspect of the invention, wherein the first housing includes a first housing body constituting part of the hinge and a guide plate fixed to the first housing body and having the first and second guide grooves formed therein, and a pair of said telescopic shafts are supported to the guide plate above the right and left ends of the first guide groove.

With the above configuration, since the guide plate is provided with the first and second guide grooves and the supporting points at which the telescopic shafts are supported, the first and second guide pins and the urging mechanisms are exactly arranged in a narrow region. Furthermore, the guide plate can be assembled in a unit with the link member and the urging mechanisms attached thereto and the guide plate assembled in the unit can be attached to the first housing body.

In a ninth aspect of the invention, the folding portable electronic device according to any one of the first to eighth aspects of the invention is configured to be put on a place so that when the first housing is opened from the second housing, the second housing rests on the place whether the display part is in the vertical position or in the horizontal position.

With the above configuration, even away from home, the user can watch TV or the like on the display part in the horizontal position without using any supporting means for supporting the folding portable electronic device.

In a tenth aspect of the invention, the portable electronic device according to any one of the first to ninth aspects of the invention is a mobile phone.

With the above configuration, in a multi-function, frequently-used mobile phone, the display part can easily be changed to the horizontal or vertical position in either turning direction, i.e., both clockwise and counterclockwise as viewed from the front.

As described so far, according to the present invention, the cam mechanism supports the display part to allow the display part to turn both clockwise and counterclockwise as viewed from the front while controlling the path of the display part. Therefore, whether the user is left-handed or right-handed, he or she can turn the display part in a desired direction to change its position from vertical to horizontal. Furthermore, whether the user holds the folding portable electronic device in the right hand or left hand, he or she can freely select the direction of turning the display part. Furthermore, the size of the entire folding portable electronic device can be easily restrained by appropriately arranging the first and second guide grooves. Thus, the size of the entire folding portable electronic device can be restrained while the display part is maintained in a large screen size, and the display part can be turned from the vertical position to the horizontal position both clockwise and counterclockwise as viewed from the front. Furthermore, the cam mechanism includes an urging mechanism urging the second guide pin to allow the display part to reach the vertical or horizontal position in either turning direction to assist the user's operation of position change of the display part. Therefore, the user can change the display part to the vertical or horizontal position in either turning direction, i.e., both clockwise and counterclockwise as viewed from the front, with one hand through one touch operation. This provides an extremely ease operation of position change of the display part.

DETAILED DESCRIPTION OF THE INVENTION

Hereinafter, an embodiment of the present invention will be described with reference to the drawings.

Figure 1:
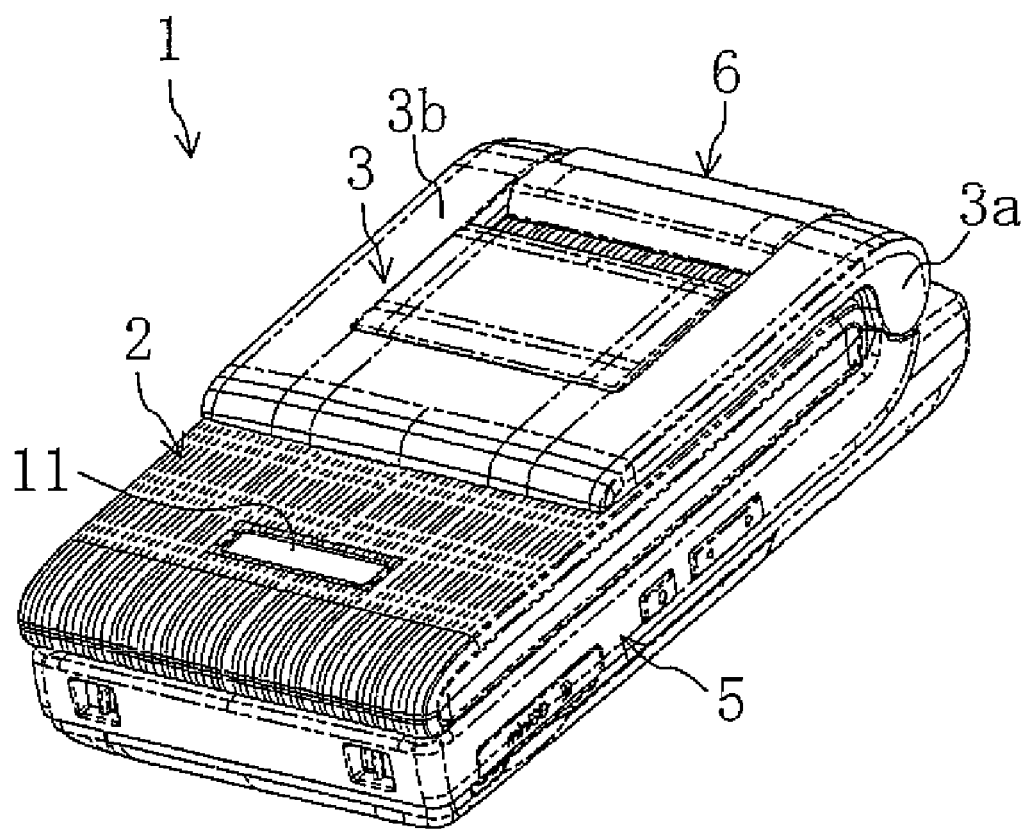
FIG. 1 is a perspective view showing a folding mobile phone according to an embodiment of the present invention, in which the mobile phone is in a folded state.
Figure 2:
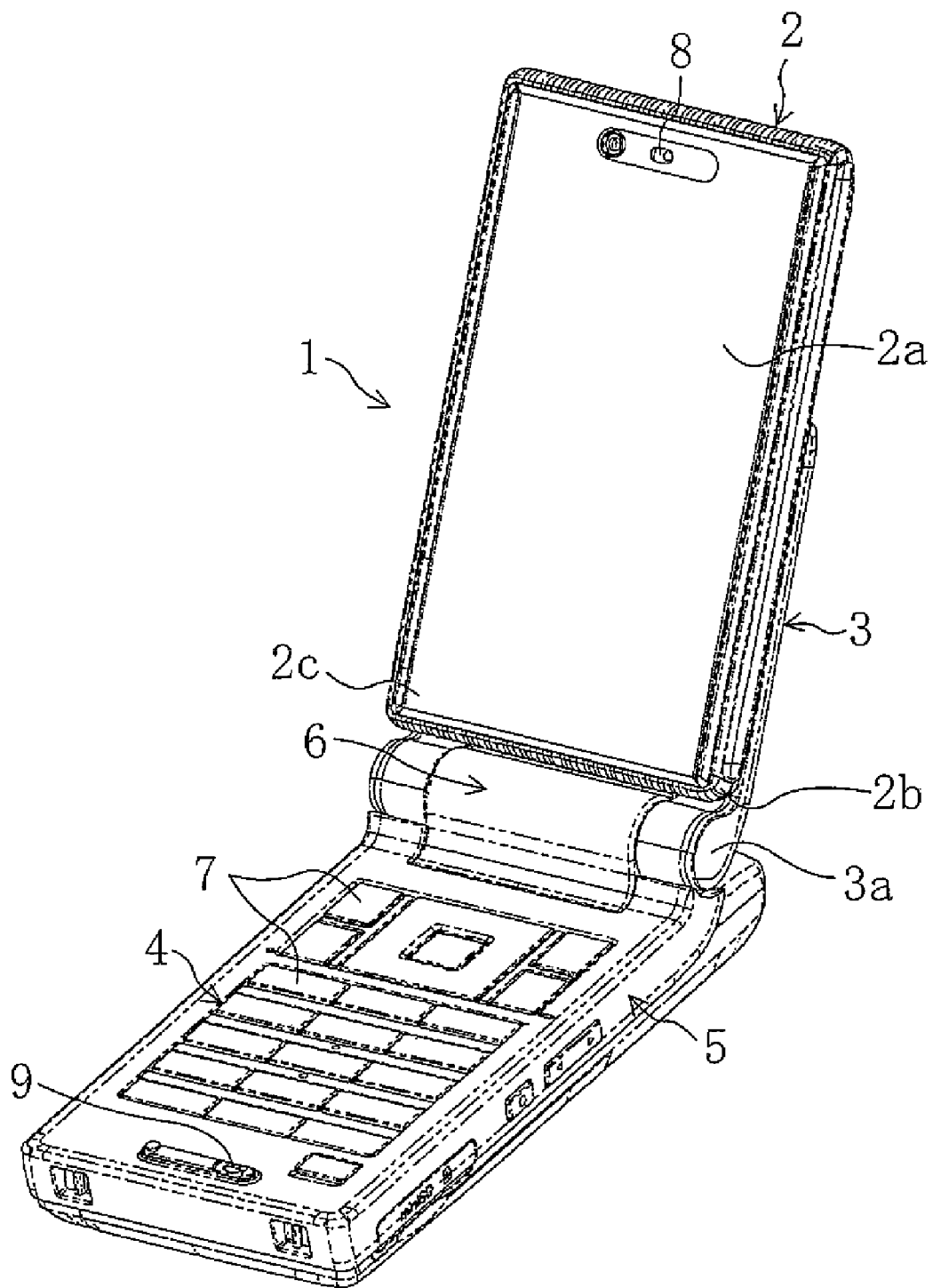
FIG. 2 is a perspective view showing the folding mobile phone in opened state in which its liquid crystal display part is in a vertical position.
Figure 3:
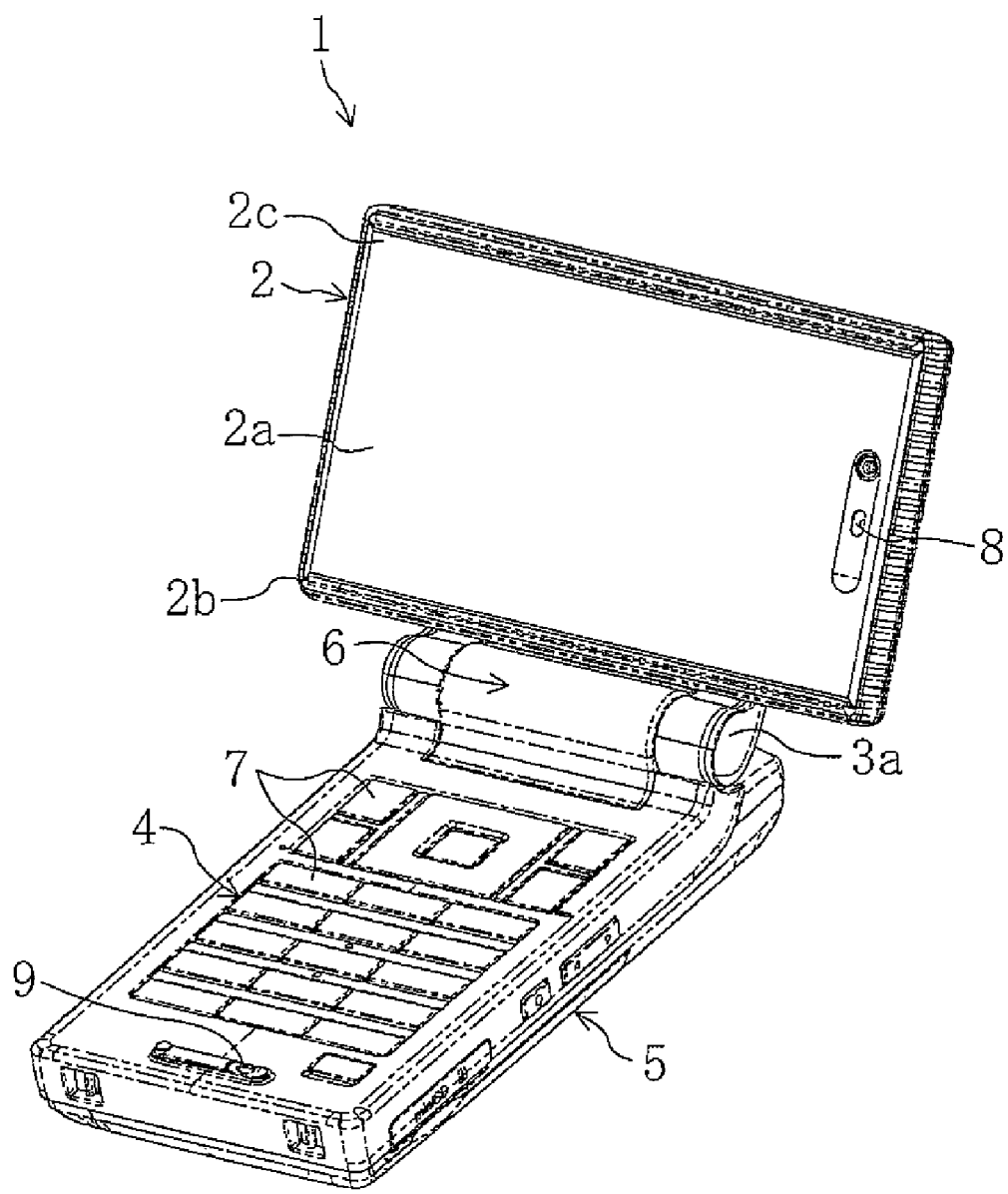
FIG. 3 is a perspective view showing the folding mobile phone in opened state in which the liquid crystal display part is in a horizontal position.

FIG. 1 is a perspective view showing a folding mobile phone according to an embodiment of the present invention, in which the mobile phone is in a folded state. FIG. 2 is a perspective view showing the folding mobile phone in opened state in which its liquid crystal display part is in a vertical position. FIG. 3 is a perspective view showing the folding mobile phone in opened state in which the liquid crystal display part is in a horizontal position.

The folding mobile phone 1, which is a folding portable electronic device according to an embodiment of the present invention, includes a first housing 3 including a liquid crystal display part 2 as a display part provided at a surface thereof, a second housing 5 including an operating part 4 at a surface thereof, and a hinge 6 connecting the first and second housings 3 and 5 to allow them to be freely opened and closed in their folded form. Thus, the folding mobile phone 1 can be changed between two states, a folded state shown in FIG. 1 and an opened state shown in FIGS. 2 and 3.

The operating part 4 of the second housing 5 is provided with a plurality of operation keys 7. These operation keys 7 are arranged to allow keying-in when the user holds the entire folding mobile phone 1 in a vertical position and have marks put on their surfaces. Through the operation of these operation keys 7, the user can be offered various functions of the folding mobile phone 1. The second housing 5 is provided also with a microphone 9 for communications.

The liquid crystal display part 2 and the operating part 4 are configured to appear when the first housing 3 is opened from the state folded on the second housing 5. Therefore, with this configuration of the folding mobile phone 1, whether the liquid crystal display part 2 is in a vertical position or a horizontal position, the user can operate the consistently vertically oriented operation keys 7 of the operating part 4 while viewing a liquid crystal display 2a of the liquid crystal display part 2.

The liquid crystal display part 2 has a linear lower end as viewed in the vertical position and its liquid crystal display 2a is formed in a rectangular shape to occupy most of one surface of the liquid crystal display part 2. The liquid crystal display part 2 has a speaker 8 for communications provided at the upper end as viewed in the vertical position. The four corners of the liquid crystal display part 2 including lower right and left corners 2b and 2c may be rounded in consideration of design or safety. The back face of the liquid crystal display part 2 is provided at an upper part thereof with a back liquid crystal display 11 for displaying mainly the time and sometimes other types of information. The user can see the time or other information with the mobile phone folded.

As shown in FIGS. 2 and 3, the lateral middles of the liquid crystal display part 2 in the vertical and horizontal positions are each located substantially in the lateral middle of the first housing 3. When the liquid crystal display part 2 is in the horizontal position, it may not be located exactly in the lateral middle of the first housing 3 and may be slightly offset to the left or right.

Figure 4:
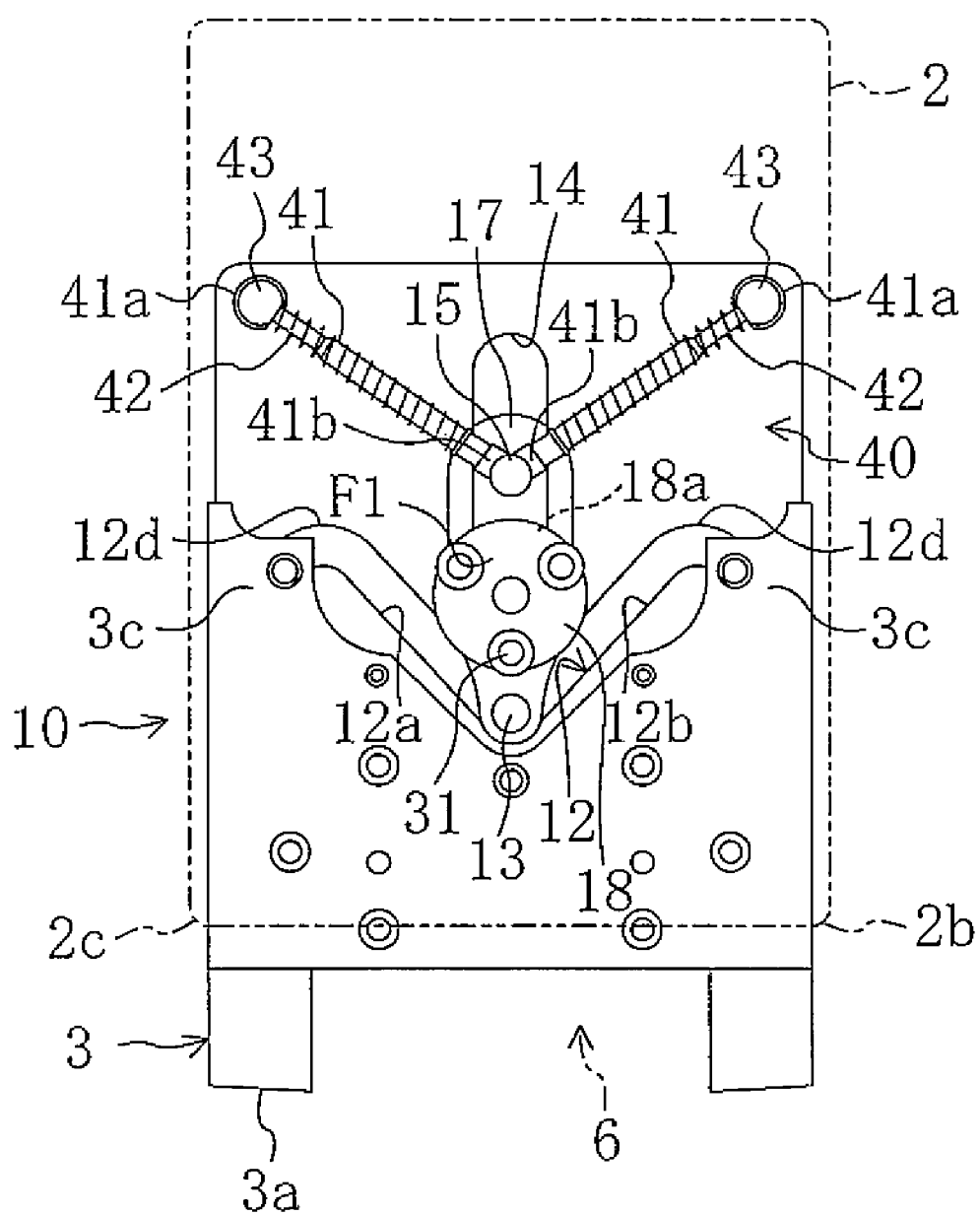
FIG. 4 is a front view showing a cam mechanism and its surrounding part when the liquid crystal display part is in the vertical position.
Figure 5:
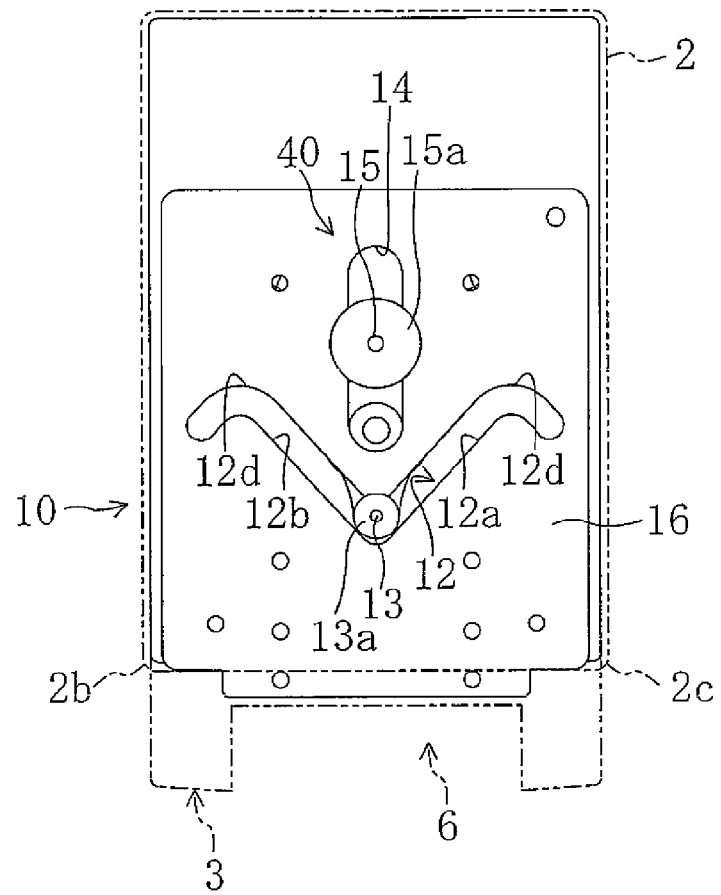
FIG. 5 is a back view showing the cam mechanism and its surrounding part when the liquid crystal display part is in the vertical position.

FIGS. 4 and 5 show the liquid crystal display part 2 and its surrounding part in dash-double-dot lines and show a cam mechanism 10 in easily visible front and back views. The first housing 3 is provided with a cam mechanism 10 that serves as a support mechanism for supporting the liquid crystal display part 2 in the shape of a substantially rectangular plate to allow the liquid crystal display part 2 to be changed between vertical and horizontal positions. Furthermore, the cam mechanism 10 supports the liquid crystal display part 2 to allow the liquid crystal display part 2 to turn both clockwise and counterclockwise as viewed from the front. For easy view, FIGS. 5 and 7 to 12 show a guide plate 16 in the solid line and the outlines of the other parts of the first housing 3 in the dash-double-dot lines.

The first housing 3 includes a first housing body 3a of which a lower end part constitutes right and left end parts of the hinge 6, a guide plate 16 fixed to the back face of the first housing body 3a (of which the outline is shown only in FIG. 4), and a back cover 3b covering the back face of the first housing 3. The hinge 6 is formed at the lower end of the first housing body 3a to swell towards the front and extend laterally. An unshown hinge element is contained in the swelled part to assist in opening and closing the first and second housings 3 and 5 while unfolding and folding them, respectively. The cam mechanism 10 supports the liquid crystal display part 2 to guide its change between vertical and horizontal positions so that the lower right corner 2b of the liquid crystal display part 2 moves along the hinge 6 when the liquid crystal display part 2 is changed in position while turning clockwise and that the lower left corner 2c of the liquid crystal display part 2 moves along the hinge 6 when the liquid crystal display part 2 is changed in position while turning counterclockwise.

The guide plate 16 is made of approximately rectangular sheet metal of, for example, stainless steel. If the first housing body 3a is composed of a part made, for example, of high-rigidity metal or fiber-reinforced plastic and the guide plate 16 is attached to the first housing body 3a, the thickness of the entire first housing 3 can be reduced.

Figure 6:
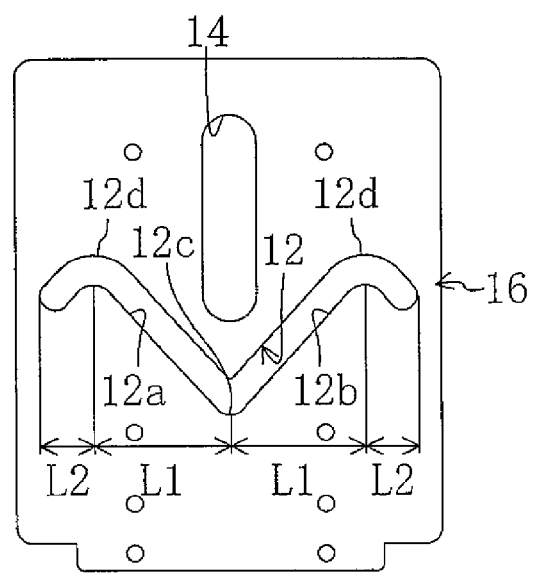
FIG. 6 is a front view showing a guide plate.

The cam mechanism 10 has first and second guide grooves 12 and 14. FIG. 6 shows the guide plate 16 as viewed from the front. The first and second guide grooves 12 and 14 are formed in the guide plate 16. The first guide groove 12 is formed bilaterally symmetrically and includes an upcurved left section 12a and an upcurved right section 12b that join together at a midpoint 12c. The first guide groove 12 is formed by the peripheral edge of an opening most projecting downward at the midpoint 12c as viewed from the front and having a general shape like a sea gull with its wings extended. In each of the left and right sections 12a and 12b of the first guide groove 12, the length L1 from the midpoint 12c to an intermediate curve peak 12d is longer than the length L2 from the intermediate curve peak 12d to the outside end (i.e., L1>L2). According to this configuration, the lateral dimension (width) of the first guide groove 12 can be shortened, which prevents the size of the entire folding mobile phone 1 from increasing.

The second guide groove 14 is formed by the peripheral edge of an opening substantially vertically extending at a distance away from the first guide groove 12 in the first housing 3, more specifically substantially vertically extending from above the midpoint 12c of the first guide groove 12. The groove width of the second guide groove 14 is wider than that of the first guide groove 12. Note that, as described later, the shapes of the first and second guide grooves 12 and 14 are not limited to those in this embodiment.

Since the first and second guide grooves 12 and 14 are both bilaterally symmetric, the grooves can be easily arranged, whereby it can be easily prevented that the first guide groove 12 appears during the turning of the liquid crystal display part 2. In order to prevent the right and left ends of the first guide groove 12 from appearing during the turning of the liquid crystal display part 2, the upper edge of the first housing body 3a is extended at both lateral ends to form extensions 3c and 3c as shown in FIG. 4. The extensions 3c and 3c are formed to avoid contact with the after-mentioned disc 18 during turning operation of the liquid crystal display part 2.

A first guide pin 13 slidably engages into the first guide groove 12, while a second guide pin 15 slidably engages into the second guide groove 14. Specifically, the first and second guide pins 13 and 15 have their respective rings 13a and 15a (shown only in FIG. 5) on the back of the guide plate 16. The rings 13a and 15a prevent the first and second guide pins 13 and 15 from dropping off from the guide plate 16. Since the groove width of the second guide groove 14 is wider than that of the first guide groove 12, the ring 15a of the second guide pin 15 has a larger outside diameter than the ring 13a of the first guide pin 13.

The back face of the liquid crystal display part 2 is provided with a metal link member 17 connecting the first and second guide pins 13 and 15 to each other. The link member 17 has the shape of an elongated plate tapered at its lower end. The first guide pin 13 is provided at the lower end of the link member 17 to extend towards the guide plate 16 orthogonally to the link member 17. The second guide pin 15 is provided at the upper end of the link member 17 to extend towards the guide plate 16 orthogonally to the link member 17. A disc 18 is disposed on the front face of the link member 17 in the vertical middle of the front face thereof. The disc 18 is fixed to the back face of the liquid crystal display part 2 by screws 31. When the folding mobile phone 1 is in the vertical position, the disc 18, which corresponds to the conventional pivot pin extending orthogonally to the liquid crystal display part, is located substantially at the center of the first housing 3 as viewed from the front. Although not shown in detail, for example, if a through hole is formed in the center of the disc 18, a signal line can pass through the through hole to connect the liquid crystal substrate in the liquid crystal display part 2 to the main substrate in the second housing 5.

The cam mechanism 10 is provided with an urging mechanism 40 urging the second guide pin 15 to allow the liquid crystal display part 2 to reach the vertical or horizontal position in either turning direction. The urging mechanism 40 comprises a pair of right and left urging mechanisms. Each urging mechanism 40 includes a telescopic shaft 41 pivotally supported at one end 41a to the first housing 3 above the second guide groove 14 and pivotally connected at the other end 41b to the common second guide pin 15. A compression spring 42 is carried about the outer periphery of the telescopic shaft 41. The pair of telescopic shafts 41 and 41 are supported to their respective support pins 43 and 43 provided on the guide plate 16 above the right and left ends of the first guide groove 12. The compression spring 42 is configured to most contract when the liquid crystal display part 2 turns approximately 50 degrees.

Since the guide plate 16 is provided with the first and second guide grooves 12 and 14 and the support pins 43 supporting the telescopic shafts 41, the first and second guide pins 13 and 15 and the urging mechanisms 40 are exactly arranged in a narrow region. The first and second guide grooves 12 and 14, the first and second guide pins 13 and 15 and the urging mechanisms 40 are formed to be capable of assembly in a unit. The cam mechanism 10 and urging mechanisms 40 thus assembled can be attached to the first housing 3 by attaching the guide plate 16 to the first housing body 3a.

Operations

Next, a description is given of the behavior of the folding mobile phone 1 according to this embodiment.

First, when not in use or on standby, the folding mobile phone 1, as shown in FIG. 1, is folded by closing the first and second housings 3 and 5.

Then, when the first housing 3 and the liquid crystal display part 2 are opened from the second housing 5 as shown in FIG. 2, the liquid crystal display part 2 and the operating part 4 appear. During normal phone call and mail sending/receiving, the folding mobile phone 1 is used by keying-in on the operating part 4 as the liquid crystal display part 2 is in the vertical position.

On the other hand, in viewing the screen in landscape mode, such as watching programs of terrestrial digital television broadcasting and creating or reading English mails, the user turns the liquid crystal display part 2 to change the position from vertical to horizontal.

First, a description is given of the method for tuning the liquid crystal display part 2 clockwise as viewed from the front. As shown in FIGS. 4 and 5, when the liquid crystal display part 2 is in the vertical position, the first guide pin 13 is located at the lateral midpoint of the first guide groove 12 and the second guide pin 15 is located at the midpoint of the second guide groove 14.

Figure 7:
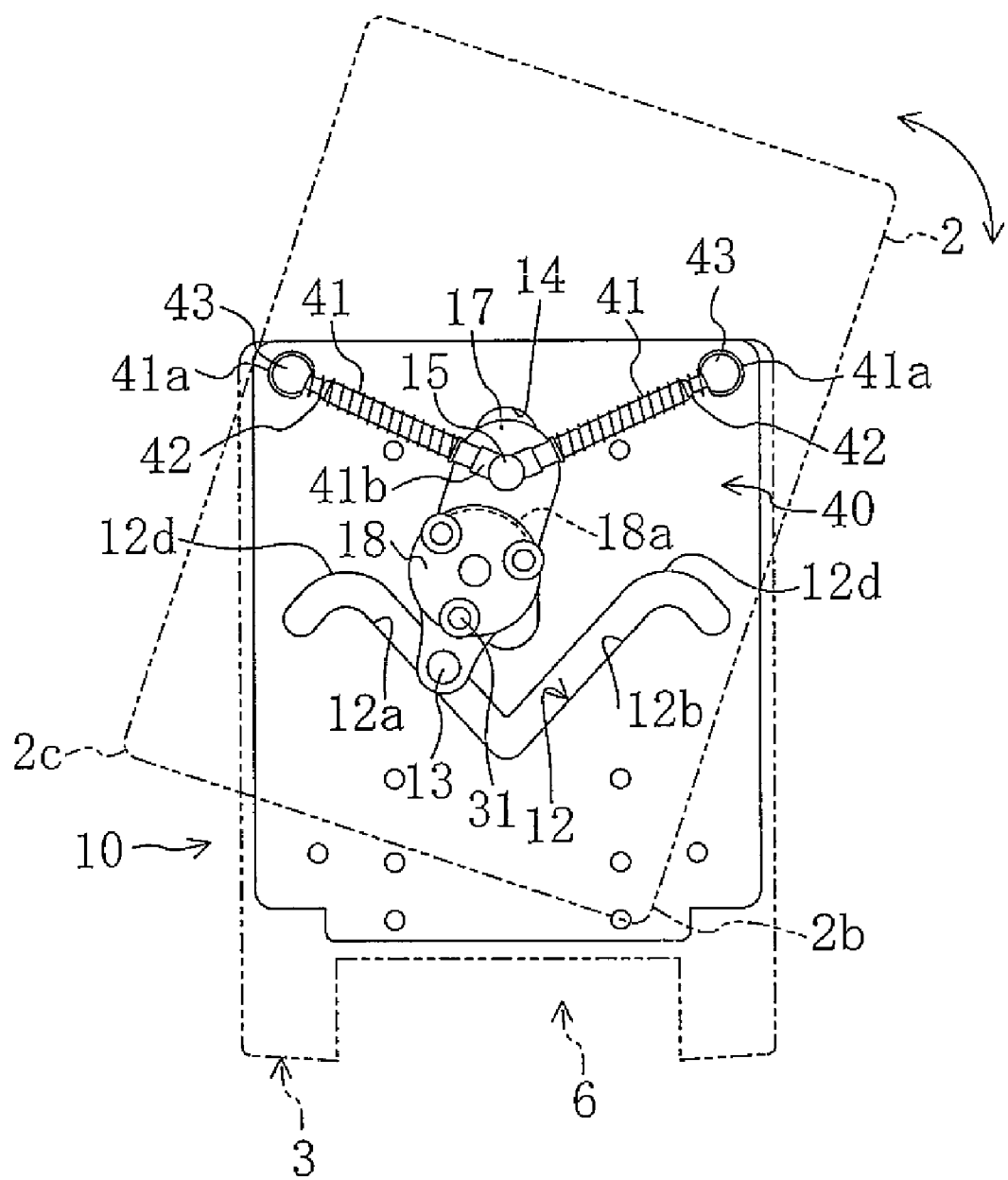
FIG. 7 is a corresponding view of FIG. 4, illustrating a state of the liquid crystal display part being turned clockwise from its vertical position.

When the user operates the turning of the liquid crystal display part 2 with the thumb of the right hand, he or she clockwise pushes the lower right corner 2b of the liquid crystal display part 2 in the vertical position. Thus, as shown in FIG. 7, by the action of the cam mechanism 10, the first guide pin 13 slides to the left in the left section 12a of the first guide groove 12 in engaged relation with the first guide groove 12 while moving up towards the curve peak 12d thereof and concurrently the second guide pin 15 slides upward in the second guide groove 14 in engaged relation with the second guide groove 14. When the second guide pin 15 slides up in the second guide groove 14 as is engaged therein, the telescopic shafts 41 are contracted to compress the compression springs 42, whereby resilient energy is accumulated in the urging mechanisms 40. Therefore, the user turns the liquid crystal display part 2 against a reaction force of the compression springs 42.

Figure 8:
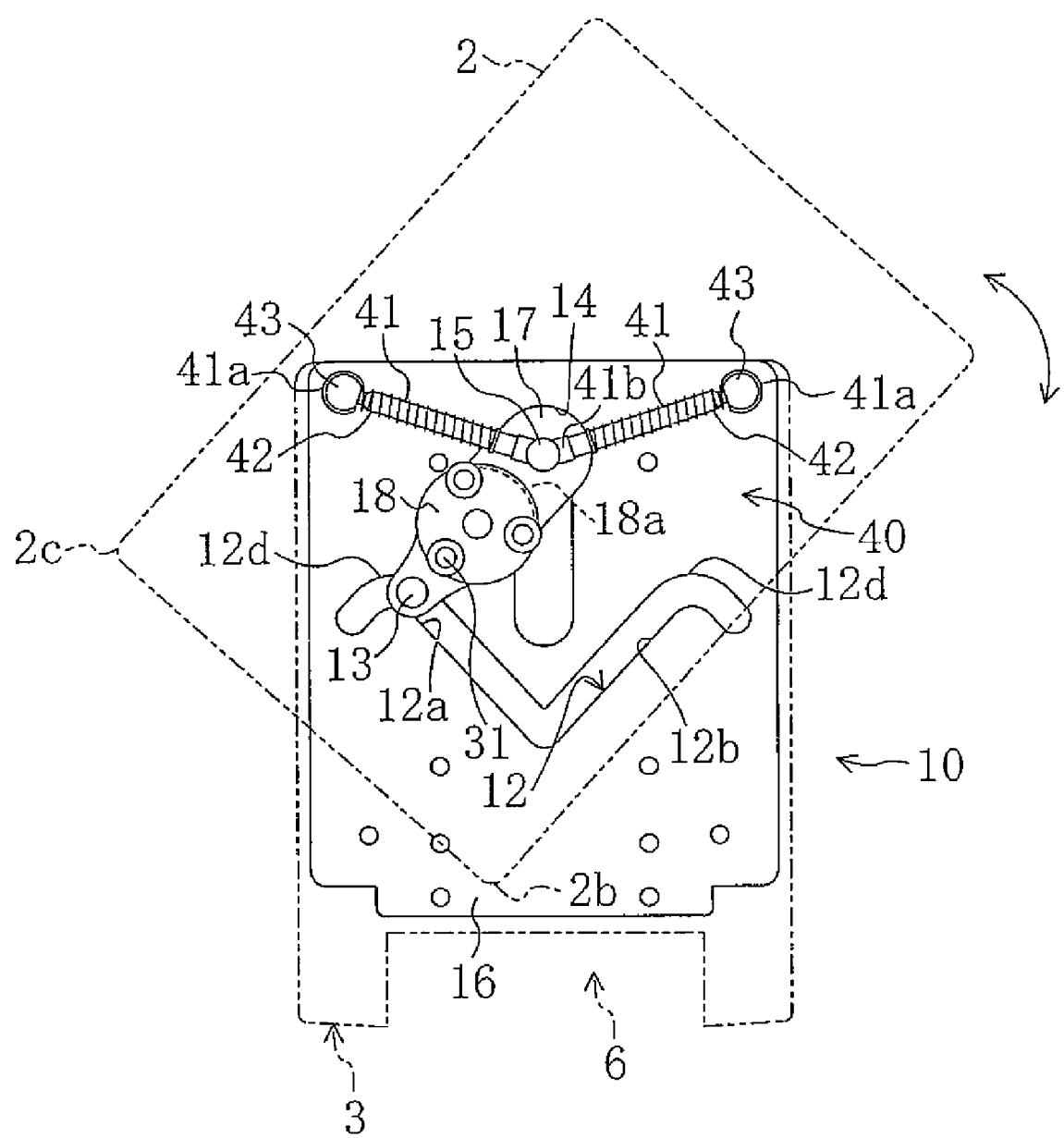
FIG. 8 is a corresponding view of FIG. 4, illustrating another state of the liquid crystal display part being turned clockwise from its vertical position.
Figure 9:
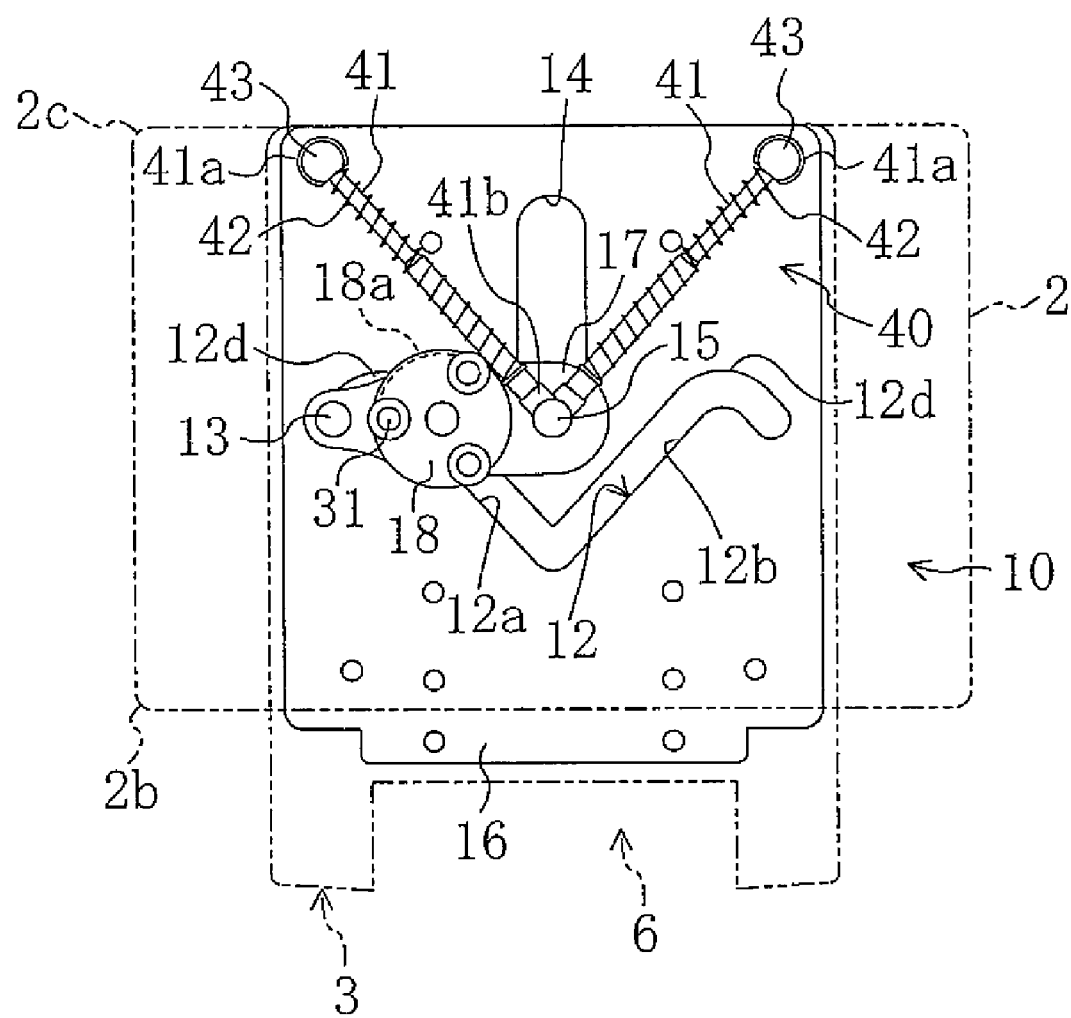
FIG. 9 is a corresponding view of FIG. 4, illustrating the horizontal position of the liquid crystal display part after being turned clockwise from its vertical position.

Then, the first guide pin 13 reaches the curve peak 12d as shown in FIG. 8. When the first guide pin 13 then passes the curve peak 12d, it slides to the left in the left section 12a of the first guide groove 12 while moving down and concurrently the second guide pin 15 slides down in the second guide groove 14 as is engaged therein. During the time, the second guide pin 15 is pushed back by an urging force of the compressed compression springs 42, whereby the liquid crystal display part 2 turns while being assisted by the urging force and then automatically reaches the horizontal position shown in FIG. 9.

After use, the user turns the upper right corner of the liquid crystal display part 2 against the urging force of the compression springs 42 in the opposite direction to the direction as described above until the first guide pin 13 reaches the curve peak 12d. When the first guide pin 13 passes the curve peak 12d, it is pushed back by the compression springs 42 and the liquid crystal display part 2 returns to the vertical position while being assisted by the compression springs 42.

Figure 10:
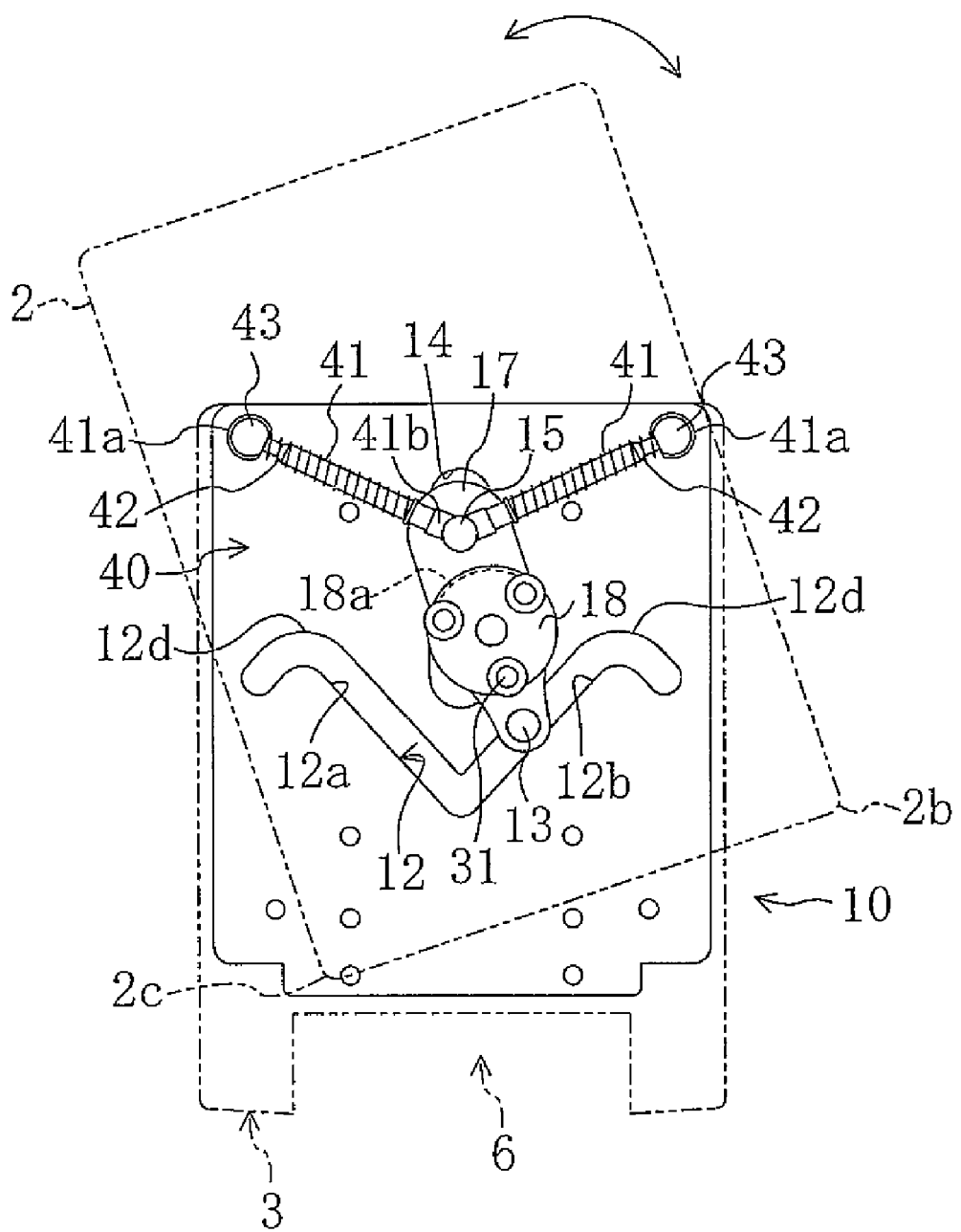
FIG. 10 is a corresponding view of FIG. 4, illustrating a state of the liquid crystal display part being turned counterclockwise from its vertical position.

Next, a description is given of the method for turning the liquid crystal display part 2 counterclockwise. When the user operates the turning of the liquid crystal display part 2 with the thumb of the right hand, he or she pushes the lower left corner 2c of the liquid crystal display part 2 in the vertical position shown in FIG. 4 counterclockwise as viewed from the front. Thus, as shown in FIG. 10, by the action of the cam mechanism 10, the first guide pin 13 slides to the right in the right section 12b of the first guide groove 12 in engaged relation with the first guide groove 12 while moving up towards the curve peak 12d thereof and concurrently the second guide pin 15 slides upward in the second guide groove 14 in engaged relation with the second guide groove 14. When the second guide pin 15 slides up in the second guide groove 14 as is engaged therein, the telescopic shafts 41 are contracted to compress the compression springs 42, whereby resilient energy is accumulated in the urging mechanisms 40. Therefore, the user turns the liquid crystal display part 2 against a reaction force of the compression springs 42.

Figure 11:
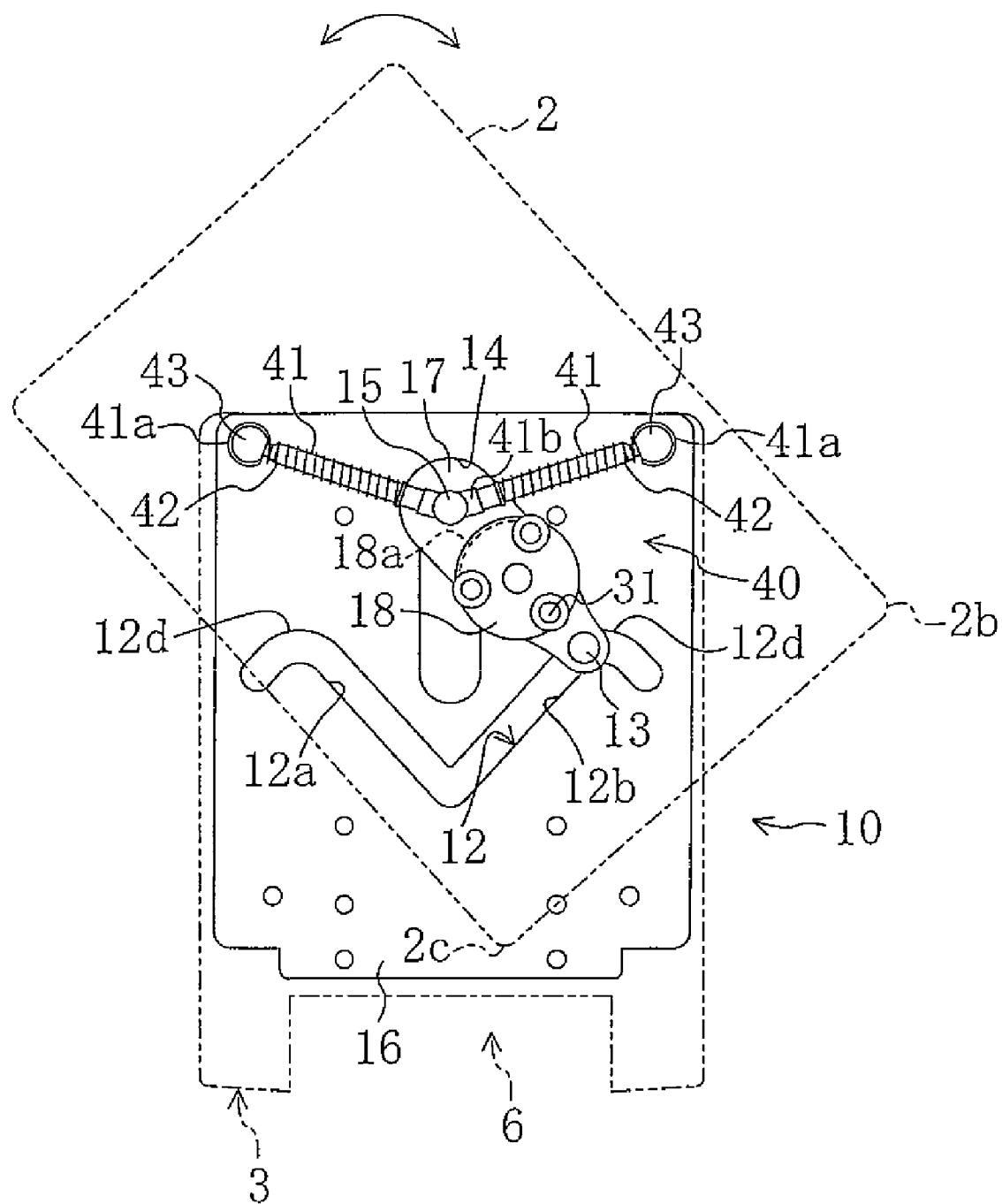
FIG. 11 is a corresponding view of FIG. 4, illustrating another state of the liquid crystal display part being turned counterclockwise from its vertical position.
Figure 12:
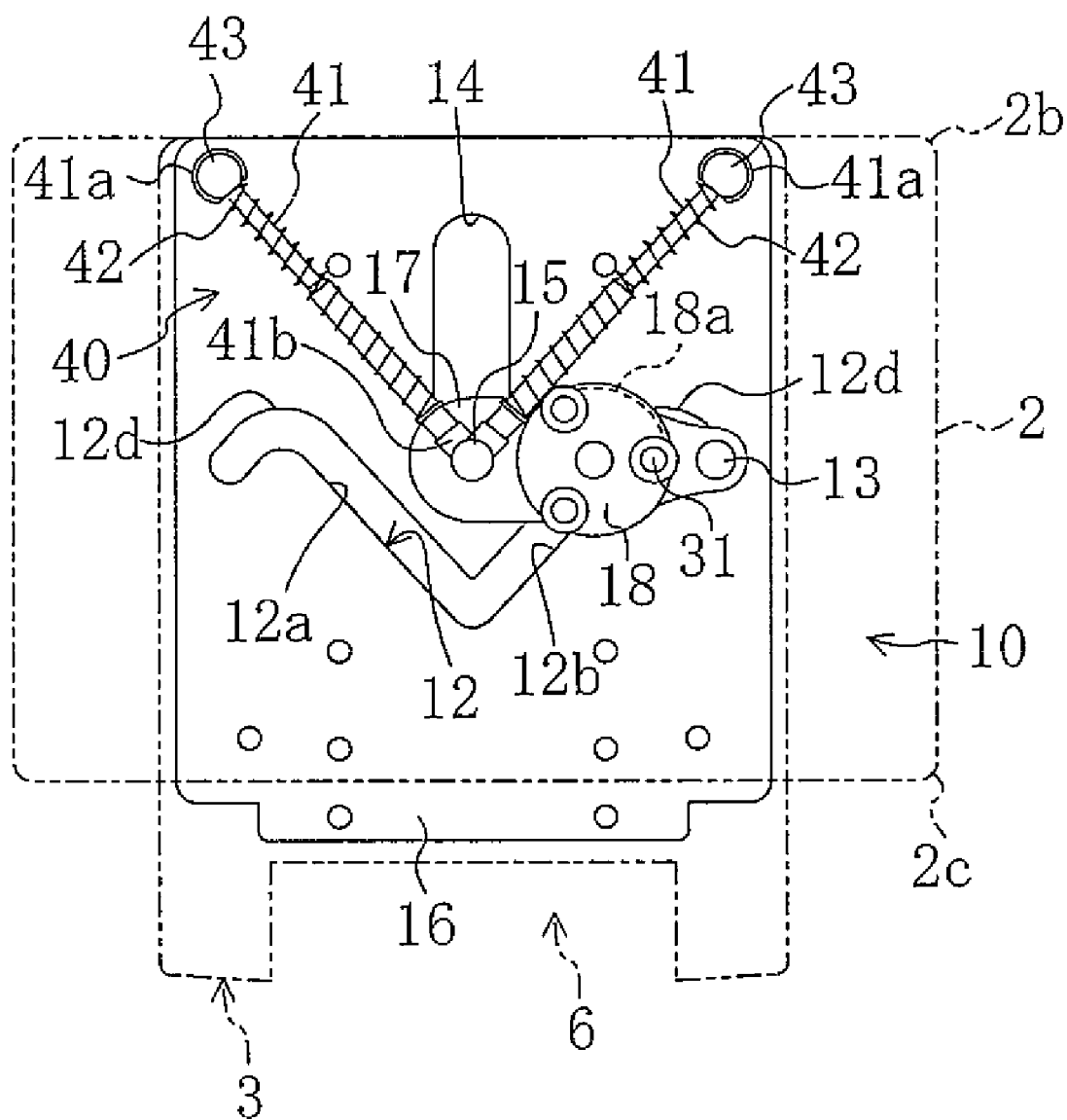
FIG. 12 is a corresponding view of FIG. 4, illustrating the horizontal position of the liquid crystal display part after being turned counterclockwise from its vertical position.

Then, the first guide pin 13 reaches the curve peak 12d as shown in FIG. 11. When the first guide pin 13 then passes the curve peak 12d, it slides to the right in the right section 12b of the first guide groove 12 while moving down and concurrently the second guide pin 15 slides down in the second guide groove 14 as is engaged therein. During the time, the second guide pin 15 is pushed back by an urging force of the compressed compression springs 42, whereby the liquid crystal display part 2 turns while being assisted by the urging force and then automatically reaches the horizontal position shown in FIG. 12.

After use, the user turns the upper left corner of the liquid crystal display part 2 against the urging force of the compression springs 42 in the opposite direction to the direction as described above until the first guide pin 13 reaches the curve peak 12d. When the first guide pin 13 passes the curve peak 12d, it is pushed back by the compression springs 42 and the liquid crystal display part 2 returns to the vertical position while being assisted by the compression springs 42.

Then, the first and second housings 3 and 5 are folded against each other, so that the mobile phone 1 is on standby.

As described so far, in changing the position of the liquid crystal display part 2, the liquid crystal display part 2 is guided and supported both during clockwise turning and during counterclockwise turning so that the lowermost end of the lower right corner 2b or lower left corner 2c moves keeping a distance from the hinge 6. Therefore, the liquid crystal display part 2 can be prevented from coming into contact with the hinge 6. Hence, even if the lower end of the liquid crystal display part 2 is not rounded along a semicircle having the radius around the pivot pin for the liquid crystal display part 2 as would otherwise conventionally be done, the liquid crystal display part 2 does not come into contact with the hinge 6. Since the liquid crystal display part 2 is supported to the first housing 3 to be capable of turning both clockwise and counterclockwise as viewed from the front, the liquid crystal display part 2 of the folding mobile phone 1 can be turned in a user's desired direction and changed to its vertical or horizontal position.

Furthermore, since the first guide groove 12 is formed bilaterally symmetrically, the liquid crystal display part 2 exhibits similar behaviors during clockwise turning and counterclockwise turning as viewed from the front.

Also when the liquid crystal display part 2 is in the horizontal position shown in FIG. 3, the lateral middle of the liquid crystal display part 2 is located substantially in the lateral middle of the first housing 3. The liquid crystal display part 2 is set, in this position, so that a landscape image can be largely displayed on the liquid crystal display 2a. Therefore, when the liquid crystal display part 2 is in the horizontal position, the user can enter a quiz program via TV and use TV shopping or bank remittance via TV while keying in on the operating part 4. In other words, also when the liquid crystal display part 2 is in the horizontal position, the user can easily operate the operating part 4 in a familiar arrangement of the vertically oriented operation keys 7 while viewing the liquid crystal display 2a of the liquid crystal display part 2.

Furthermore, the folding mobile phone 1 can be put on a place so that when the first housing 3 is opened from the second housing 5, the second housing 5 rests on the place whether the liquid crystal display part 2 is in the horizontal position or the vertical position. Therefore, even away from home, the user can watch TV or the like on the liquid crystal display part 2 in the horizontal position without using any supporting means for supporting the folding mobile phone 1.

Effects of Embodiment

As seen from the above, according to the folding mobile phone 1 according to this embodiment, the cam mechanism 10 supports the liquid crystal display part 2 to allow it to turn both clockwise and counterclockwise as viewed from the front while controlling the path of the liquid crystal display part 2. Therefore, whether the user is left-handed or right-handed, he or she can turn the liquid crystal display part 2 in a desired direction to change its position from vertical to horizontal. Furthermore, whether the user holds the folding mobile phone 1 in the right hand or left hand, he or she can freely select the direction of turning the liquid crystal display part 2. Furthermore, the size of the entire mobile phone 1 can be easily restrained by appropriately arranging the first and second guide grooves 12 and 14. Thus, the size of the entire folding mobile phone 1 can be restrained while the liquid crystal display part 2 is maintained in a large screen size, and the liquid crystal display part 2 can be turned from the vertical position to the horizontal position both clockwise and counterclockwise as viewed from the front. Furthermore, the cam mechanism 10 includes the urging mechanism 40 urging the second guide pin 15 to allow the liquid crystal display part 2 to reach the vertical or horizontal position in either turning direction to assist the user's operation of position change of the liquid crystal display part 2. Therefore, the user can change the liquid crystal display part 2 to the vertical or horizontal position in either turning direction, i.e., both clockwise and counterclockwise as viewed from the front, with one hand through one touch operation. This provides an extremely ease operation of position change of the liquid crystal display part 2.

One end 41a of each telescopic shaft 41 is pivotally supported to the first housing 3 above the second guide groove 14, the other end 41b is pivotally connected to the second guide pin 15 and a compression spring 42 is carried about each telescopic shaft 41. Therefore, the second guide pin 15 can be urged with a very simple structure to assist the user's operation of position change of the liquid crystal display part 2.

Since the urging mechanism 40 comprises a pair of right and left urging mechanisms to apply a force to the second guide pin 15 from the right and left and thereby stably turn the liquid crystal display part 2, the position change of the liquid crystal display part 2 can be smoothly operated.

Since the first guide groove 12 is formed bilaterally symmetrically, the arrangement of grooves can be facilitated and the liquid crystal display part 2 can be turned with a similar behavior in either turning direction. Therefore, the size of the entire folding mobile phone 1 can be restrained and the operability thereof can be enhanced.

In each of the left and right sections 12a and 12b of the first guide groove 12, the length L1 from the midpoint 12c to the intermediate curve peak 12d is longer than the length L2 from the intermediate curve peak 12d to the outside end, thereby reducing the lateral dimension of the first guide groove 12. This easily restrains the increase in the size of the entire folding mobile phone 1 and prevents the exposure of the first guide groove 12 during turning of the liquid crystal display part 2 to provide a good appearance.

Furthermore, by means of the cam mechanism 10, the liquid crystal display part 2 is changed to the horizontal position or the vertical position in either turning direction, i.e., both clockwise and counterclockwise as viewed from the front, so that the lower right corner 2b or the lower left corner 2c moves along the hinge 6 while keeping a distance from the hinge 6. Therefore, even if the liquid crystal display part 2 has a substantially rectangular shape, it is prevented from coming into contact with the hinge 6 and the swelled part at the lower end of the first housing 3, thereby providing a large display screen.

Furthermore, by means of the earn mechanism 10, the liquid crystal display part 2 is changed in position while preventing its contact with the other parts of the mobile phone 1 in either turning direction, i.e., both clockwise and counter clockwise as viewed from the front, so that the lateral middles of the liquid crystal display part 2 in both the vertical and horizontal positions are each located substantially in the lateral middle of the first housing 3. Therefore, the liquid crystal display part 2 can be located in the lateral middle of the entire folding mobile phone 1 not only in the vertical position but also in the horizontal position while providing a screen as large as possible. This provides a folding mobile phone 1 having a good appearance, ease of view and a good operability.

The guide plate 16 of the first housing 3 is provided with the first and second guide grooves 12 and 14 and the support pins 43 supporting the telescopic shafts 41, and the first and second guide pins 13 and 15 and the urging mechanisms 40 are disposed in a narrow region. This restrains the size of the entire folding mobile phone 1 and enhances the portability thereof.

Furthermore, since the folding mobile phone 1 in opened state can be put on a place with the second housing 5 resting on the place whether the liquid crystal display part 2 is in the horizontal position or the vertical position, the user can comfortably watch TV or the like with the folding mobile phone 1 put on a suitable place, without using any additional device.

Other Embodiments

The above embodiment of the present invention may have the following configurations.

The shapes of the first and second guide grooves 12 and 14 are not limited to those in the above embodiment. The second guide groove 14 may extend in a direction inclined with respect to an axial direction of the hinge 6 as in the above embodiment.

Figure 13A:
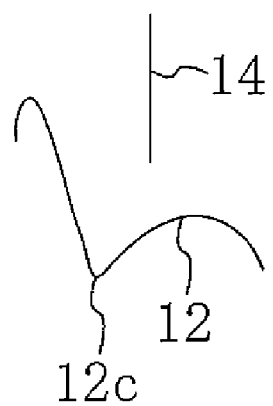
FIG. 13 is a front view showing the shapes of first and second guide grooves in a folding portable electronic device according to another embodiment of the present invention.
Figure 13B:
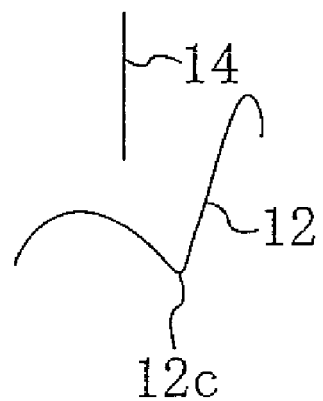
Figure 13C:
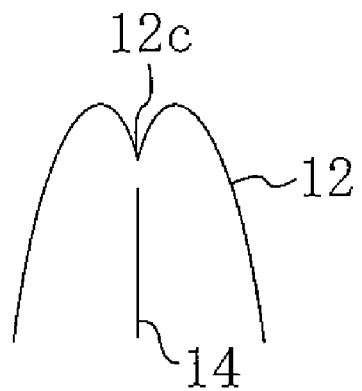

Although in the above embodiment the second guide groove 14 is formed just above the midpoint 12c of the first guide groove 12, it can be formed above the midpoint 12c of the first guide groove 12 and offset to the right or left from the midpoint 12c as shown in FIGS. 13A and 13B. In such cases, the first guide groove 12 has a shape in which one of the right and left section towards which the second guide groove 14 offsets has a lower curve peak than the other. Alternatively, as shown in FIG. 13C, the second guide groove 14 can be formed below the midpoint 12c of the first guide groove 12. In such a case, the urging mechanisms 40 are also arranged below the midpoint 12c of the first guide groove 12.

In the above embodiment, the cam mechanism 10 guides and supports the liquid crystal display part 2 so that the lower right corner 2b moves along the hinge 6 when the liquid crystal display part 2 is changed in position while turning clockwise and that the lower left corner 2c moves along the hinge 6 when the liquid crystal display part 2 is changed in position while turning counterclockwise. The paths of the lower corners 2b and 2c can be controlled by appropriately selecting the shapes of the first and second guide grooves 12 and 14 and may be linear or curved. Such control makes it possible, for example, to place a camera or other components in the swelled part at the lower end of the first housing 3. Also in this case, the lower right and left corners 2b and 2c of the liquid crystal display part 2 can be prevented from coming into contact with the swelled part.

Although in the above embodiment the lateral middles of the liquid crystal display part 2 in the vertical and horizontal positions are located substantially in the lateral middle of the first housing 3, they may be slightly offset to the right or left.

Although in the above embodiment the liquid crystal display part 2 serving as a display part includes a liquid crystal display 2a, it can include an organic EL display instead. The organic EL display needs little electricity to work because of self-emission of light, has a wider angle of visibility than the liquid crystal display and can be reduced in thickness because of no need for backlighting. On the other hand, the liquid crystal display 2a can be produced at lower cost and has a longer life than the organic EL display. The back liquid crystal display 11 can also be composed of an organic EL display.

Although in the above embodiment the folding portable electronic device is a mobile phone, it can be a PC, mobile tool, electronic dictionary, electronic calculator, copy camera or any other folding portable electronic device. Furthermore, the folding portable electronic device of the present invention may be a folding portable communications device such as PHS or PDA. In each of these cases, there is provided a high operability, compact, high commercial value folding portable electronic device easily changeable to the horizontal or vertical position.

The above embodiments are merely illustrative in nature and are not intended to limit the scope, applications and use of the invention.

What is claimed is:

1. A folding portable electronic device including:
   a first housing including a display part provided at a surface thereof;
   a second housing including an operating part provided at a surface thereof; and
   a hinge connecting the first and second housings to allow the first and second housings to be freely opened and closed in their folded form,
   the display part being supported to the first housing through a support mechanism changeably between a vertical position and a horizontal position, wherein
   the support mechanism comprises a cam mechanism including:
      a first guide groove formed in the first housing and composed of an upcurved left section and an upcurved right section continued to the left section;
      a second guide groove formed in the first housing away from the first guide groove;
      a first guide pin slidably engaged into the first guide groove;
      a second guide pin slidably engaged into the second guide groove; and
      a link member provided to the back face of the display part and connecting the first and second guide pins to each other,
   the cam mechanism supports the display part to allow the display part to turn clockwise and counterclockwise as viewed from the front, and
   the cam mechanism includes an urging mechanism urging the second guide pin to allow the display part to reach the vertical or horizontal position both clockwise and counterclockwise.

2. The folding portable electronic device of claim 1, wherein the urging mechanism includes:
   a telescopic shaft pivotally supported at one end to the first housing above the second guide groove and pivotally connected at the other end to the second guide pin; and
   a compression spring carried about the telescopic shaft.

3. The folding portable electronic device of claim 2, wherein the urging mechanism comprises a pair of right and left urging mechanisms.

4. The folding portable electronic device of claim 1, wherein
   the first guide groove is formed bilaterally symmetrically, and
   the second guide groove extends substantially vertically from above a midpoint of the first guide groove at which the left and right sections are joined.

5. The folding portable electronic device of claim 4, wherein in each of the left and right sections of the first guide groove, the length from the midpoint to an intermediate curve peak is longer than the length from the intermediate curve peak to the outside end.

6. The folding portable electronic device of claim 1, wherein the cam mechanism is configured to guide and support the display part to allow the display part to be changed between the vertical position and the horizontal position so that a lower right corner of the display part moves along the hinge when the display part is changed in position while turning clockwise as viewed from the front and that a lower left corner of the display part moves along the hinge when the display part is changed in position while turning counterclockwise as viewed from the front.

7. The folding portable electronic device of claim 1, wherein the lateral middles of the display part in the vertical and horizontal positions are each located substantially in the lateral middle of the first housing.

8. The folding portable electronic device of claim 7, wherein
   the first housing includes a first housing body constituting part of the hinge and a guide plate fixed to the first housing body and having the first and second guide grooves formed therein, and
   a pair of said telescopic shafts are supported to the guide plate above the right and left ends of the first guide groove.

9. The folding portable electronic device of claim 1, configured to be put on a place so that when the first housing is opened from the second housing, the second housing rests on the place whether the display part is in the vertical position or in the horizontal position.

10. The folding portable electronic device of claim 1, wherein the folding portable electronic device is a mobile phone.

* * * * *